United States Patent [19]

Ahmed

[11] Patent Number: 5,385,758
[45] Date of Patent: Jan. 31, 1995

[54] METHOD FOR APPLYING AUTODEPOSITION COATING

[75] Inventor: Bashir M. Ahmed, Utica, Mich.

[73] Assignee: Henkel Corporation, Plymouth Meeting, Pa.

[21] Appl. No.: 999,479

[22] Filed: Dec. 30, 1992

[51] Int. Cl.6 ............................................. B05D 1/02
[52] U.S. Cl. ................... 427/421; 427/388.1; 427/409; 427/435
[58] Field of Search ............ 427/409, 435, 421, 388.1

[56] References Cited

U.S. PATENT DOCUMENTS

| | | | |
|---|---|---|---|
| 3,592,699 | 7/1971 | Steinbrecher et al. | 148/6.2 |
| 3,617,368 | 11/1971 | Gibbs et al. | 117/161 UT |
| 3,709,743 | 1/1973 | Dalton et al. | 148/6.2 |
| 3,922,451 | 11/1975 | Anschutz et al. | 428/35 |
| 4,103,049 | 7/1978 | Nishida et al. | 427/341 |
| 4,160,756 | 7/1979 | Nishida et al. | 427/435 |
| 4,178,400 | 12/1979 | Lochel, Jr. | 427/435 |
| 4,186,226 | 1/1980 | Smith | 427/409 |
| 4,191,676 | 3/1980 | Hall | 260/29.7 |
| 4,243,704 | 1/1981 | Hall et al. | 427/435 |
| 4,313,861 | 2/1982 | Bassett et al. | 260/29.6 |
| 4,347,172 | 8/1982 | Nishida et al. | 524/319 |
| 4,373,050 | 2/1983 | Steinbrecher et al. | 524/405 |
| 4,636,264 | 1/1987 | Schellenberg et al. | 427/409 |
| 4,636,265 | 1/1987 | Fischer et al. | 427/435 |
| 4,647,480 | 3/1987 | Ahmed | 427/341 |
| 4,874,673 | 10/1989 | Donovan et al. | 428/463 |
| 5,011,715 | 4/1991 | Broadbent | 427/435 |

FOREIGN PATENT DOCUMENTS

| | | | |
|---|---|---|---|
| 26664 | 4/1981 | European Pat. Off. | 427/409 |

*Primary Examiner*—Anthony Green
*Attorney, Agent, or Firm*—Ernest G. Szoke; Wayne C. Jaeschke; Allen R. Kipnes

[57] ABSTRACT

Process for forming an autodeposition coating on a metallic substrate by applying an autodepositing composition from a motile source thereof such as by spraying or by treating the surface with a continuous stream of the autodepositing composition.

11 Claims, 3 Drawing Sheets

METHOD FOR APPLYING AUTODEPOSITION COATING

BACKGROUND

1. Field Of The Invention

This invention relates to processes for applying an autodepositing composition in the form of a resinous coating on metallic surfaces. More specifically, this invention relates to processes of applying an autodepositing composition by a flowing stream or spray of the composition onto metallic surfaces.

2. Discussion of Related Art

Autodeposition is a process whereby an aqueous resinous coating composition of low solids concentration (usually less than about 10% by weight) forms a coating of high solids concentration (usually greater than about 10% by weight) on a metallic surface. The surface is immersed in an autodeposition bath with the coating increasing in thickness and/or weight the longer the time the metallic surface is immersed in the composition.

Autodeposition is similar to electrodeposition, but does not require the aid of external electrical current to cause the resin particles to deposit on the metal surface. In general, autodepositing compositions are aqueous acid solutions having solid resin particles dispersed therein.

The autodeposition process is typically carried out in the following manner. The metallic surface is precleaned and rinsed with water. The precleaned surface is then immersed in the autodepositing composition for a period of time within the range of about 30 seconds or less to about 3 minutes. The composition is typically agitated during the autodeposition process and may be heated if heavier coatings are desired.

The process of autodeposition by immersing the metallic surface in the autodeposition bath, while commercially viable, is less than desirable for coating objects where only a portion of the surface is to be coated, such as in the production of shock absorbers. Those surfaces which are not to be coated must be masked during autodeposition and the mask removed after the object has emerged from the bath. This procedure is time consuming and adds significantly to the cost of the autodeposition process.

It would, therefore, be desirable to provide a method of applying an autodeposition coating to a metallic surface, or portion thereof, without immersing the object to be coated in a bath.

BRIEF SUMMARY OF THE INVENTION

The present invention is generally directed to a process of forming a resinous coating on a substrate having a metallic surface using an autodepositing composition. Unlike prior methods which have immersed the metallic substrate in a stagnant bath comprised of the autodepositing composition, the present invention performs the coating operation without immersing the metallic surface in an autodeposition bath. Instead, the metallic surface is contacted with a motile source of the autodepositing composition such as a stream or spray to provide for a continuous coating of the resinous material. The present invention is particularly suited to the autodepositing of a coating on objects whose surfaces are only to be partially coated.

BRIEF DESCRIPTION OF THE DRAWINGS

The following drawings are for illustrative purposes only and are not intended to limit the invention as encompassed by the claims forming part of the application.

DETAILED DESCRIPTION OF THE INVENTION

Coating compositions which form autodeposited coatings of the type that can be employed in the present invention generally comprise resin-containing acidic aqueous compositions. Such compositions attack and dissolve metal ions from a metallic surface in an amount sufficient to directly or indirectly cause resin particles in the region of the metallic surface to deposit thereon in a continuous fashion. The process is conducted in a manner such that the amount of resin deposited on the surface increases as the time the surface is in contact with the composition increases. This deposition of the resin on the metallic surface is achieved through chemical action of the coating composition on the metallic surface. The use of electricity which is necessary for the operation of electrocoating methods is not required.

In accordance with the present invention an autodeposited coating is obtained by treating a metallic surface with a motile source of an autodepositing composition. As used herein a "motile source of an autodepositing composition" shall mean a stream, spray or other moving source of an autodepositing composition as compared to a stagnant bath where the metallic surface is immersed within a bath contained within a fixed space.

The autodepositing composition is applied by placing the motile source of the composition, typically in the form of a continuous or intermittent stream or spray, in contact with a metallic surface which itself may be in motion or fixed. The autodepositing composition is directed at the metallic surface in a manner and in an amount sufficient to cover the entire surface or only a desired portion of the metallic surface by forming a film thereon having a desired thickness.

Figure 1:
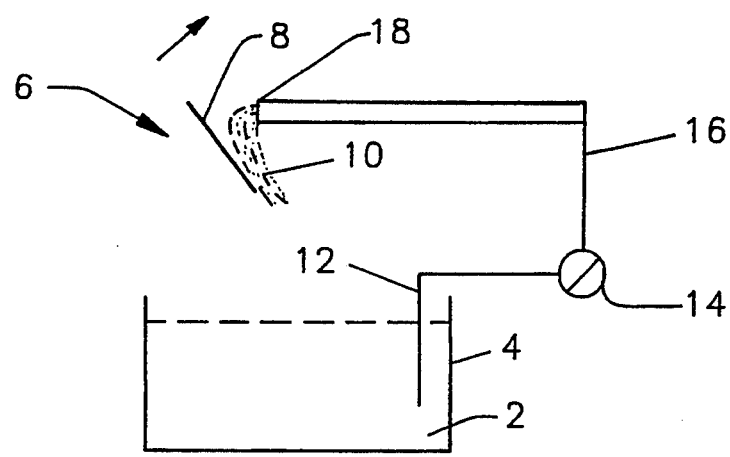
FIG. 1 is a schematic view of apparatus used in accordance with the present invention to apply a continuous stream of an autodepositing composition on a metallic surface using a single conduit.

Referring to FIG. 1, there is shown an embodiment of the invention where the autodepositing composition is applied as a continuous stream along a metallic surface.

An autodepositing composition as described hereinafter is stored as an autodepositing bath 2 in a vessel 4 made of a material such as plastic (e.g. polyvinylchloride), rubber (e.g. Triflex made by B. F. Goodrich Company) or any other inert material which is inert with respect to the autodepositing composition. Alternatively, the vessel may be lined with a suitable inert material such as a rubber liner made of Triflex. The object to be coated, typically a panel 6 having a metallic surface 8, is positioned so as to be impinged by a stream 10 of the autodepositing composition.

The stream 10 is formed by passing the autodepositing composition from the bath 2 through a conduit 12 by the pressure generated by a pump 14. The autodepositing composition proceeds through the conduit 16 and is evacuated out of an exit port 18. The exit port 18 may be made of any material which is inert to the autodepositing composition including PVC, rubber and the like. The thickness of the coating will depend principally on the flow rate of the autodepositing composition, the length of exposure to the autodepositing composition, and whether the flow is continuous or intermittent, as explained hereinafter.

In general, the flow rate of the autodepositing composition is based on the ability of the composition to wet a designated area. The larger the area to be coated, the greater the flow rate that may be required. Typical flow rates are in the range of about 0.001 ml/cm$^2$ to 100 ml/cm$^2$, preferably 5 ml/cm$^2$ to 10 ml/cm$^2$.

The flow rate of the autodepositing composition must be sufficient to cover the designated area with a sufficient amount of the composition so that a layer of resin particles can form and build up over the time of exposure to the composition. The flow rate is, therefore, selected on the basis of a unit area per unit of time.

The thickness of the coating is also dependent on the length of the coating cycle. The thickness of the coating will generally vary directly with the length of time of deposition. The longer the panel is exposed to the autodepositing composition, the greater the thickness of the resulting coating. If a greater amount of the autodepositing composition is applied to the panel, a greater amount of the resin particles will be available to form the coating. Conversely, reducing the length of exposure to the autodepositing coating will result in a relatively thinner coat being formed on the panel. In accordance with the present invention, a 0.3 mil thick coating can be obtained in about one second of exposure at a flow rate within the range of 5 ml/cm$^2$ to 10 ml/cm$^2$.

The thickness of the autodepositing coating is also dependent on whether the coating is applied continuously or intermittently. It has been found that thicker coats can be obtained when the autodepositing composition is applied intermittently.

The term "intermittent" as used herein shall mean that the spacings between the flows of the composition shall be long enough so that the composition contacting the panel has sufficient time to adhere to the surface of the panel, yet is short enough so that composition does not dry. If drying does occur prior to completion of the autodepositing process, the subsequent flows of the composition will not be able to dissolve the metallic surface because the liquid composition will not be able to penetrate the dried resin layer. On the other hand, if the composition is applied continuously to an uncoated panel, an initial layer of the resin layer is deposited. However, it is difficult for a buildup of the resin particles to occur under a continuous flow because the underlying layer can not interact with the metal surface before being washed off by the autodepositing composition.

The length of time it takes to deposit a coating of the composition in turn is dependent on the flow rate, the type of flow, and the temperature of the autodepositing composition. Deposition of the autodepositing composition depends on the removal of metallic ions from the metallic surface and the deposit of resin particles thereon. In autodepositing compositions containing an etching agent, such as hydrogen fluoride, the rate of the removal of metallic ions varies directly with the temperature of the autodepositing composition. The higher the temperature of the composition, the greater is the rate of removal of metallic ions and the greater is the rate of deposit of resin particles on the metallic surface. It has been found that the temperature of the autodepositing composition should be typically within the range of from about 1° C. to 98° C. for most autodepositing applications, preferably from about 18° C. to 25° C.

Thicker coatings are best achieved by intermittent flows of the autodepositing composition. The short gaps in the flow to the panel can be generated by delivering the flow from a single source such as shown in FIG. 1 in a series of short pulses which typically last for less than one second. It is preferred, however, to generate an intermittent flow of the autodepositing composition through a modified exit port 18 having a plurality of spaced apart openings. In order to best understand the operation of both continuous and intermittent flow, reference is again made to FIG. 1 where it will be seen that the conduit 16 provides a continuous flow of the autodepositing composition out of the exit port 18.

The conduit is stationary while the panel is moved in a conventional manner transverse to the stream in the direction of the arrow. The speed at which the panel is moved will determine the amount of the autodepositing composition which contacts a given area of the panel and the length of exposure which in turn determines the thickness of the coating.

Movement of the panel can be accomplished by securing the panel to a frame which itself is positioned on a track and moving the frame along the track at a desired speed. Methods and devices for moving the panel are well known and do not materially contribute to the present invention.

Figure 2:
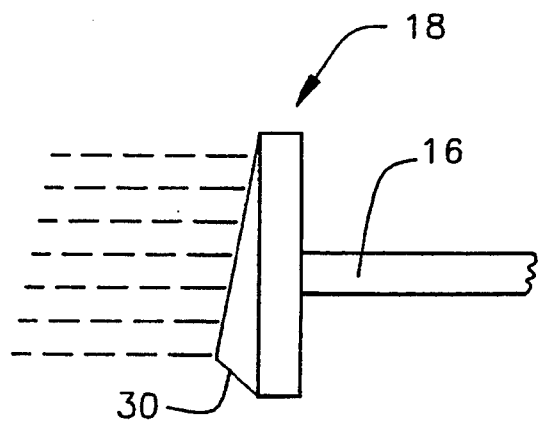
FIG. 2 is a perspective view of an exit port of another embodiment of the invention for generating a continuous stream of an autodepositing composition using a single conduit.

Another embodiment for generating a continuous flow is shown with reference to FIGS. 1 and 2. FIG. 2 shows a modified exit port 18 having a single elongated slit 30 through which the autodepositing composition contacts the panel 6. The slit 30 provides a continuous thin curtain of the autodepositing composition which is transversed by the panel 6. The thickness of the curtain is adjustable by changing the width of the slit.

Intermittent flows of the autodepositing composition are preferred for producing relatively thick coatings. Preferably, the intermittent flows are generated by a modified exit port having a plurality of spaced-apart openings. The autodeposition composition flows through each opening as a separate stream. The size of the openings and the distance between each opening are selected to insure that the resin particles of each stream will adhere to the metallic surface to build up the coating.

The size of the openings is typically at least 0.1 cm depending on the application. The maximum size of the opening is governed by the length of the exit port and the need to maintain the holes in spaced apart relationship. The distance between each opening is up to about 300 cm, preferably about one to 15 cm.

Figure 3A:
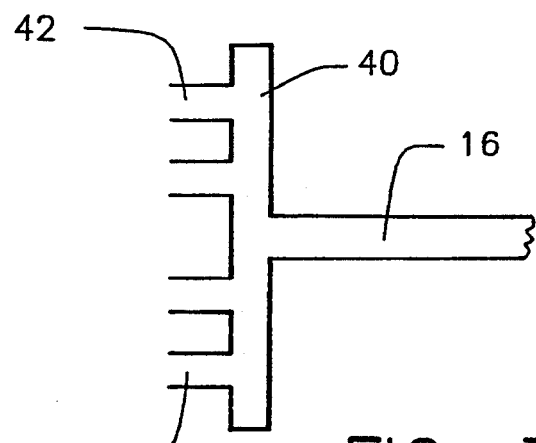
FIGS. 3A, 3B, 3C, and 3D are respective perspective views of apparatus used in accordance with the present invention to apply an intermittent stream of an autodepositing composition on a metallic surface.

Referring to FIGS. 3A–3D, there are shown several embodiments of exit ports with spaced apart openings adapted to generate an intermittent flow of the autodepositing composition. In FIG. 3A, the conduit 16 feeds the autodepositing composition into a distribution conduit 40 which runs perpendicular to the conduit 16. Extending from the conduit 40 are a plurality of spaced apart openings 42 through which the autodepositing composition is injected into the path of the panel.

Figure 3B:
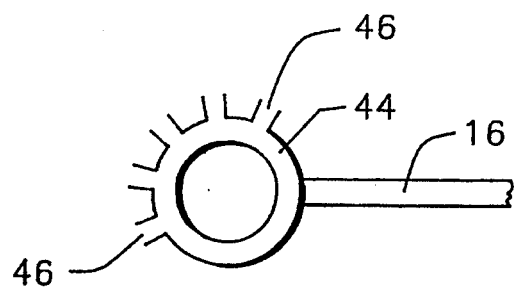
Figure 3C:
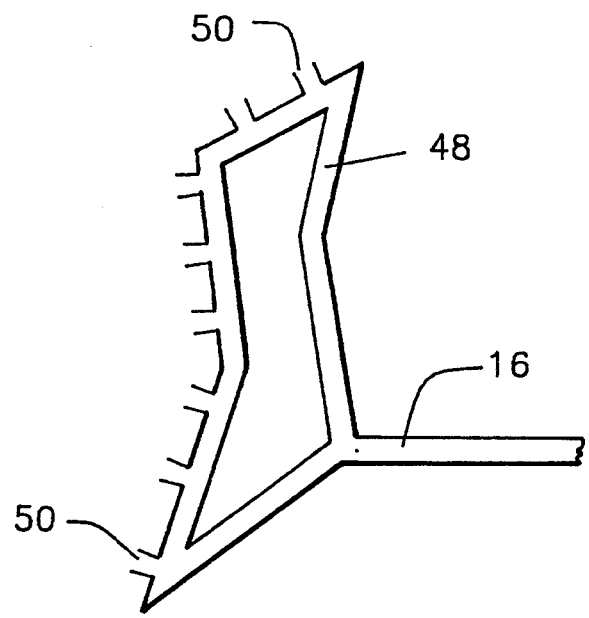

FIG. 3B shows another embodiment of the invention having a circular distribution conduit 44 with a plurality of spaced apart openings 46 arranged in a semicircular pattern. FIG. 3C shows still another embodiment of the invention employing an irregular shaped conduit 48 having a plurality of spaced apart openings 50.

Figure 3D:
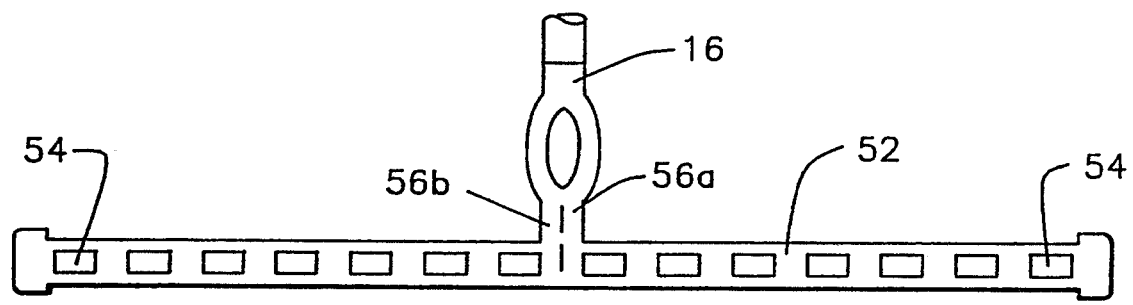

FIG. 3D shows an embodiment of an exit port having a series of uniform spaced apart openings 54 arranged in a single row. The length of the distribution conduit 52 may be approximately 6 feet long with each of the 14 openings measuring 2"×4". The distance between each opening is approximately one inch. The conduit 16 may be comprised of a bifurcated pathway 56a, 56b to assist in delivering the autodepositing composition to the entire distribution conduit 52.

The distance between the exit port 18 and the metallic surface 8 of the panel 6 is selected based on the strength of the wet film formed on the surface. A continuous layer of the autodepositing composition is required to properly coat the panel 6. In this regard, the force of the autodepositing composition as it contacts the metallic surface must be less than the level of force which will rupture, scrape, undercut or otherwise damage the autodeposited layer. Depending on the application, the distance between the exit port 18 and the metallic surface 8 is typically in the range of about close to 0 cm to 300 cm, preferably from about one cm to 15 cm. The distance selected within the desired range will depend at least in part on the size of the area to be coated. For a given shaped exit port 18, the further the exit port 18 is away from the panel 6, the greater the area that can be coated.

Figure 4:
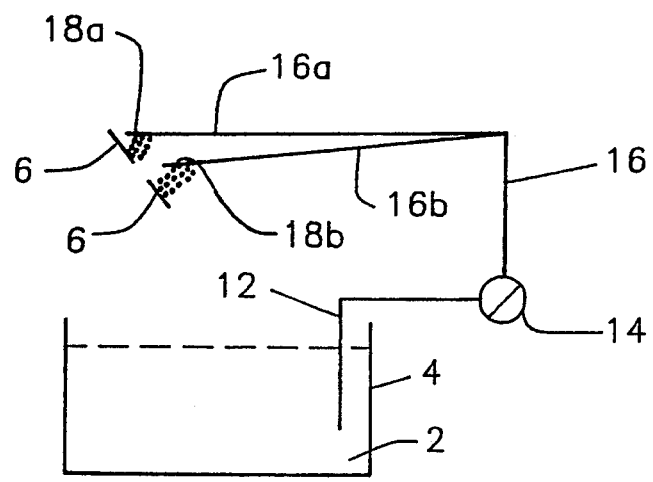
FIG. 4 is a schematic view of apparatus having multiple conduits used in accordance with the present invention to apply a stream of an autodepositing composition on one or more metallic surfaces.

The process of the present invention may be modified to provide multiple conduits for delivery of the autodepositing composition to multiple panels. Referring to FIG. 4, there is shown an embodiment of the invention employing two conduits 16a and 16b for delivering the autodepositing composition to corresponding panels 6a and 6b or to cover a greater area than possible using a single conduit. The distance between the panels is sufficient so as to insure that the stream from exit port 18a contacts only panel 6a and the stream from exit port 18b contacts only the panel 6b. It will be understood that multiple conduits can be used in accordance with the present invention to provide a continuous or intermittent flow of the autodepositing composition to the metallic surface of the object to be coated in the same manner described above in connection with the embodiments of FIGS. 1–3.

Figure 5:
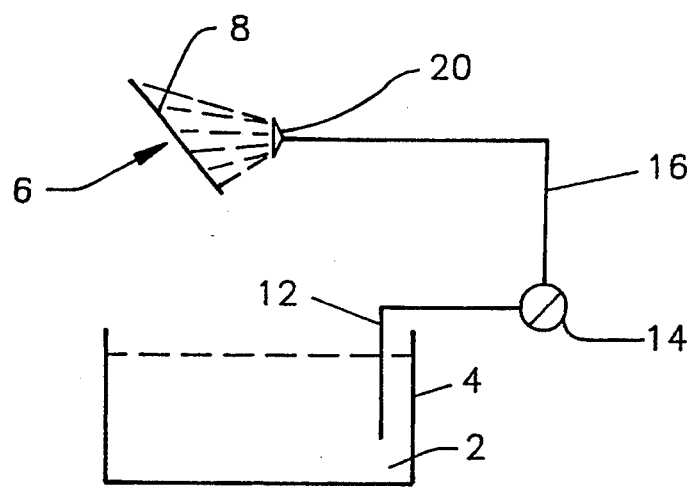
FIG. 5 is a schematic view of apparatus used in accordance with the present invention to apply a spray of an autodepositing composition on a metallic surface.

In another embodiment of the invention, the exit port can be a nozzle which is adapted to eject an atomized flow containing discreet and fine droplets of the autodepositing composition. Referring to FIG. 5, the atomized flow or spray is generated by passing the autodepositing composition through the conduit 16 and out the small openings within the nozzle 20.

The nozzle employed in the present invention may be selected from known devices used in the spray paint, perfume or other industries where fine sprays are desired. The nozzle 20 must be capable of delivering a sufficient amount of the composition to coat the metallic surface, but not enough so that dripping begins to form on the surface. The nozzle 20 should preferably deliver enough of the composition from a distance of about 6" to 12" to form a 0.3 mil coating on the surface during about one second of spray time.

The type of autodepositing compositions which may be used in the present invention are unlimited. The basic constituents of an autodepositing composition are water, resin solids dispersed in the aqueous medium of the composition and activator. The activator serves to convert the water/resin composition into one which will form on a metallic surface a resinous coating which increases in thickness or weight the longer the surface is in contact with the composition. Various types of activators or activating systems are known, for example, as reported in U.S. Pat. Nos. 3,592,699; 3,709,743; 4,103,049; 4,347,172; and 4,373,050, the disclosures of which are incorporated herein by reference.

The activating system generally comprises an acid-/oxidizing system, for example: hydrogen peroxide and HF; HNO$_3$; and a ferric-containing compound and HF; and other soluble metal-containing compounds (for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l) and an acid that can be used alone or in combination with hydrofluoric acid, and including, for example, sulfuric, hydrochloric, nitric, and phosphoric acid, and an organic acid, including, for example, ascetic, chloracetic, and trichloracetic.

The preferred activating system comprises a ferric-containing compound and hydrofluoric acid. Thus, a preferred autodepositing composition comprises a soluble ferric-containing compound in an amount equivalent to about 0.025 to 3.5 g/l ferric iron, most preferably about 0.3 to 1.6 g/l of ferric iron, and hydrofluoric acid in an amount sufficient to impart to the composition a pH within the range of about 1.6 to 5.0. Examples of the aforementioned ferric-containing compounds are ferric nitrate, ferric chloride, ferric phosphate, ferric oxide, and ferric fluoride, the last mentioned being preferred.

The types of autodeposited coatings that particularly lend themselves to being employed in the present invention are those comprising resins which fully develop their coating properties at elevated temperatures, such as temperatures up to 212° F. in the case of water and steam at atmospheric pressure, and higher temperatures in case of super heated steam, and which are not degraded at such temperatures. For many applications, such autodeposited coatings can be "cured" or heated to such a degree that those properties which depend upon proper bake schedule, such as, for example, corrosion resistance, adhesion, and hardness, can be readily achieved, even on massive parts, as well as relatively thin-wall parts, by the simple expedient of treating the freshly coated part with hot water or steam. Resins which have a minimum film temperature (MFT) or glass transition temperature (Tg) of no greater than about 140° F., preferably no greater than about 100° F., and most preferably no greater than about 85° F., are preferred for use in the present invention. Resins having such characteristics and appropriate for use in autodepositing compositions are known and are available commercially.

Examples of resins that can be used in autodepositing compositions to form coatings according to the present invention include vinyl-based resins, for example, acrylic and alkyl-substituted acrylic resins and resins prepared from other ethylenically unsaturated monomeric compounds. Examples of such resin are described in aforementioned U.S. Pat. Nos. 3,709,743 and 4,313,861, the disclosures of which are incorporated herein by reference. Resins of the aforementioned '861 patent can be used to form autodeposited coatings that have particularly good corrosion resistant properties when treated with an aqueous solution of chromium compounds and comprise a preferred class of resins for use in the present invention. Such resins, which can be prepared in the form of a latex, are the emulsion polymerized product of: (A) about 1 to 20% by weight, preferably about 4 to 14% by weight, of methacrylic acid or about 1 to 12% by weight, preferably about 4 to 10% by weight, of acrylic acid; (B) about 75 to 99% by weight of at least one other polymerizable ethylenically monounsaturated monomer; (C) about 0 to 20% by weight, of a different hydroxy group containing polymerizable vinylenically monounsaturated monomer; and (D) about 0 to 1.5% by weight, preferably no greater than about 1.25% by weight of a polymerizable vinylenically polyunsaturated monomer.

Preferred resins of the aforementioned type have a particle size of less than about 0.3 micron and more preferably a particle size of 0.15 micron or less. Preferred resins are characterized also as having a (Tg) of about 35° F. to 120° F., more preferably about 45° F. to 85° F. Preferred resins are prepared from the following monomers: as component (B) above, styrene, methyl methacrylate, butyl acrylate, ethyl acrylate, or acrylonitrile; as component (C) above, hydroxyethyl acrylate; and as component (D) above, trimethylol propane triacrylate.

Particularly preferred classes of resins for use in forming autodeposited coatings in the present invention comprise externally stabilized vinylidene chloride copolymers and internally stabilized vinylidene chloride copolymers containing in excess of about 50% by weight vinylidene chloride. Autodepositing compositions including such resins are described in U.S. patent application Ser. No. 06/723,677 filed Apr. 16, 1985 and entitled "Vinylidene Chloride Resin in Autodeposition", now abandoned, the disclosure of which is incorporated herein by reference. Of these two classes of resins, the internally stabilized copolymers are preferred. Most preferably each of the aforementioned resin classes is crystalline in nature. Autodeposited coatings prepared from vinylidene chloride-containing copolymers can have extremely high resistance to corrosion without being treated with an aqueous solution of chromium compounds or other post-treatment steps designed to improve the corrosion resistance of autodeposited coatings.

Internally stabilized polymers or resins, as mentioned above, include as part of their chemical structure a surfactant group which functions to maintain polymer particles or resin solids in a dispersed state in an aqueous medium, this being the function also performed by an "external surfactant", that is by a material which has surface-active properties and which is adsorbed on the surface of resin solids, such as those in colloidal dispersion. As is known, the presence of an external surfactant tends to increase the water sensitivity of coatings formed from aqueous resin dispersions containing the same and to adversely affect desired properties of the coatings.

The presence of undue amounts of surfactant in autodepositing compositions can lead to problems, as described in U.S. Pat. No. 4,191,676, the disclosure of which is incorporated herein by reference. The presence of an undue amount of surfactant in autodepositing compositions can deter the build-up of resin particles on the metallic surface being coated. In addition, the presence of an undue amount of surfactant can also adversely affect desired coating properties, for example, corrosion resistant properties. An advantage of internally stabilized vinylidene chloride-containing polymers is that stable aqueous dispersions, including acidic aqueous dispersions of the type comprising autodepositing compositions, can be prepared without utilizing external surfactants. (It is noted that there is a tendency in the literature to use interchangeably the following terms in connection with describing surface active materials which are used in polymerization processes for preparing polymers of the type to which the present invention relates: surfactant, wetting agent, emulsifier or emulsifying agent and dispersing agent. As used herein, the "surfactant" is intended to be synonymous with the aforementioned.) Various types of internally stabilized vinylidene chloride-containing polymers are known and species thereof are available commercially.

Various surfactants which function to maintain polymeric particles in dispersed state in aqueous medium include organic compounds which contain ionizable groups in which the anionic group is bound to the principal organic moiety of the compound, with the cationic group being a constituent such as, for example, hydrogen, an alkali metal, and ammonium. Speaking generally, exemplary anionic groups of widely used surfactants contain sulfur or phosphorous, for example, in the form of sulfates, thiosulfates, sulfonates, sulfinates, sulfaminates, phosphates, pyrophosphates and phosphonates. Such surfactants comprise inorganic ionizable groups linked to an organic moiety.

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers. In such reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising autodepositing compositions.

With respect to particular resins that can be used in the practice of the present invention, a preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

(1) about 45 to 99% by weight of vinylidene chloride monomer based on the total weight of monomers used;

(2) about 0.5 to 30% by weight based the total weight of (1) and (2) of a second relatively more hydrophilic ethylenically unsaturated monomeric material wherein such monomeric material has a solubility in both the water phase and the oil phase of the polymer latex of at least 1% by weight at the temperature of polymerization; and (3) from about 0.1 to about 5% by weight based on the total weight of other monomers of an ionic significantly water-soluble material which is copolymerizable with (2) and is selected from the group of sulfonic acids and their salts having the formula:

$$R-Z-Q-(SO_3)^- M^-$$

Examples of resins prepared from such monomers are disclosed in U.S. Pat. No. 3,617,368 incorporated herein by reference. The radical "R" is selected from the group consisting of vinyl and substituted vinyl, for example, alkyl-substituted vinyl; the symbol "Z" represents a difunctional linking group which will activate the double bond in the ninyl group; —Q— is a divalent hydrocarbon having its valence bonds on different carbon atoms; and the symbol "M+" represents a cation.

Exemplary of preferred hydrophilic monomers of (2) above, particularly when used in conjunction with monomeric vinylidene chloride are: methacrylic acid and methyl methacrylate. Other monomers which may be advantageously employed include the hydroxyethyl and propyl acrylates, hydroxyethyl-methacrylate, ethyl hexylacrylate, acrylic acid, acrylonitrile, methacrylonitrile, acrylamide, and the lower alkyl and dialkylacrylamides, acrolein, methylvinyl ketone, and vinyl acetate.

Examples of the difunctional linking roup (Z) which will activate the double bond present in the vinyl group include groups of the structure:

and the like. The alkyl group is preferably alkyl of 1 to 8 carbon atoms, especially methyl, ethyl or propyl. Examples of the aforementioned divalent hydrocarbon having its valence bonds on different carbon atoms include alkylene and arylene divalent hydrocarbon radicals. Although the alkylene (CH2) group can contain up to about 20 carbon atoms, it will generally have 1 to about 8 carbon atoms.

The solubility of the defined copolymerizable ionic material as described herein is strongly influenced by the cation M+. Exemplary cations are the free acids, alkali metal salts, ammonium and amine salts and sulfonium and quaternary ammonium salts. Preferred are the free acids, alkali metal salts, particularly sodium and potassium, and ammonium salts.

It is further noted that, with one of the ions above, and the usual choices for R and Z, the solubility of the monomer depends on Q. As indicated, this group can be either aliphatic or aromatic and its size will determine the hydrophilic/hydrophobic balance in the molecule, that is, if Q is relatively small, the monomer is water soluble, but as Q becomes progressively larger the surface activity of such monomer increases until it becomes a soap and ultimately a water insoluble wax. It is to be understood, however, that the limiting size of Q depends on R, Z and M+. As exemplary of the above, it has been found that sodium sulfoalkyl methacrylate of the formula:

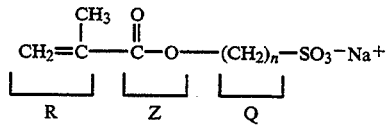

wherein n is 2, is a highly acceptable copolymerizable ionic material for use in the present invention.

Further, the selection of R and Z is governed by the reactivity needed and the selection of Q is usually determined by the reaction used to attach the sulfonic acid to the base monomer (or vice versa).

Processes for preparing latexes containing resins of the aforementioned type are known, such latexes being commercially available and being referred to herein as "self-stabilizing latexes", that is, latexes, the polymeric particles of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water (about 72 dynes/cm). It has been observed that autodepositing compositions containing such latexes form coatings which build up at a relatively fast rate.

A preferred autodepositing composition comprises the use of vinylidene chloride-containing latexes in which a water soluble ionic material such as, for example, sodium sulfoethyl methacrylate is copolymerized with the commonomers comprising the copolymer. Sodium sulfoethyl methacrylate is particularly effective for use with monomeric vinylidene chloride and the relatively hydrophilic monomers methyl methacrylate or methacrylic acid when used in the amounts and in the manner described above.

Particularly preferred latexes for use in this invention are latexes with about 35 to 60% by weight of solids comprising a polymeric composition prepared by emulsion polymerization of vinylidene chloride with one or more comonomers selected from vinyl chloride, acrylic acid, a lower alkyl acrylate (such as methyl acrylate, ethyl acrylate, butyl acrylate), methacrylic acid, methyl methacrylate, acrylonitrile, methacrylonitrile, acrylamide, and methacrylamide and stabilized with sulfonic acid or sulfonic acid salt of the formula:

$$R-Z-(CH_2)_n-(SO_3)^- M^+$$

wherein R represents vinyl or lower alkyl-substituted vinyl, Z represents one of the functional groups:

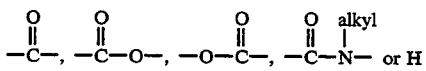

n is an integer from 1 to 20 (preferably 1 to 6) and M+ is hydrogen or an alkali metal cation, preferably sodium or potassium.

A subgroup of preferred polymers are those having at least about 50% by weight of vinylidene chloride, but less than about 70% by weight, and about 5 to 35% by weight vinyl chloride, and about 5 to 20% by weight of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and about 1 to 3% by weight of sulfoethyl methacrylate.

A particularly preferred group of latexes, however, are latexes containing about 30 to 70% by weight of solids formed by emulsion polymerization of about 50 to 99% by weight of vinylidene chloride based on the total weight of the polymer and about 0.1 to 5% by weight of sulfoethyl methacrylate, with optionally other comonomers selected from the group consisting of vinyl chloride, acrylic and methacrylic monomers such as acrylonitriles, acrylamides, methacrylamides and mixtures thereof in amounts between about 5 and 50% by weight, and substantially free of unpolymerized surfactant or protective colloid.

Among other preferred subclasses of resin for use in this invention are dispersions of copolymers of about 50 to 90% by weight vinylidene chloride, about 5 to 30% by weight of butyl acrylate and optionally about 1 to 2% by weight of sulfoethyl methacrylate based on the total weight of polymer. Another preferred subclass of polymers are the latexes of vinylidene chloride-containing polymers internally stabilized with sulfoethyl methacrylate and free of surfactant, and including optionally vinyl chloride and one or more acrylic comonomers.

Another preferred vinylidene chloride-containing copolymer is one comprising about 15 to 20% by weight of vinyl chloride, about 2 to 5% by weight of butyl acrylate, about 3 to about 10% by weight of acrylonitrile, and optionally about 1 to 2% by weight of sulfoethyl methacrylate. This particular copolymer will have less than 70% by weight vinylidene chloride copolymer based upon the total weight of comonomers (including the sulfoethyl methacrylate) used in the emulsion polymerization.

In its most preferred form, the present invention comprises the curing of coatings formed from internally stabilized vinylidene chloride-containing resins of the type used in Example 1 reported hereinbelow. Such resins are of relatively high crystallinity. Exemplary crystalline resins are described in U.S. Pat. No. 3,922,451, incorporated herein by reference, and aforementioned U.S. Pat. No. 3,617,368. Generally speaking, crystalline vinylidene chloride-containing resins comprise a relatively high proportion of vinylidene chloride, for example, at least about 80% by weight thereof.

With respect to preferred externally stabilized vinylidene chloride-containing resins, they contain a high proportion of vinylidene chloride, that is, in excess of 50% by weight. The amount of vinylidene chloride comprising the resin should be less than 100% by weight for the reason that the pure homopolymer of vinylidene chloride is thermally unstable. Examples of monomers that can be copolymerized with vinylidene chloride to form a thermally stable copolymer include one or more of vinyl chloride, acrylic acid, methacrylic acid, methylacrylate, methyl methacrylate, ethylacrylate, butylacrylate, acrylonitrile, methacrylonitrile, acrylamide and methacrylamide. A few examples of externally stabilized vinylidene chloride polymers that can be used in the practice of the present invention are the following: (A) about 50 to 90% by weight of vinylidene chloride, about 5 to 20% by weight of acrylonitrile and about 5 to 20% by weight of butyl acrylate; (B) about 60 to 76% by weight of vinylidene chloride, about 4 to 10% by weight of ethylhexyl acrylate or methacrylate, and about 1 to 4% by weight of acrylic acid; and (C) 66% by weight of vinylidene chloride and 34% by weight of vinyl chloride. In preferred form, the externally stabilized vinylidene chloride-containing resin is crystalline in nature.

Externally stabilized resins of the above type are prepared typically by emulsion polymerization utilizing a sufficient amount of surfactant to maintain the resulting resins particles in a dispersed state in the aqueous medium of the reaction mixture. The nature of this resin type is that the structure of the polymer molecule requires that surfactant be present to maintain the colloidal dispersion of the resulting latex, the surfactant being adsorbed on the surface of the resin particles.

Examples of surfactants (emulsifiers) that can be used to prepare such latexes are: sodium dodecylbenzene sulfonate, alkyl sulfates, sodium dioctyl sulfosuccinate, alkylphenolicethoxylate, sulfonates, sodium dodecyldiphenyl oxide disulfonate, sodium oleoyl isopropanolamide sulfosuccinate, and sodium lauryl sulfate. These surfactants or emulsifiers are exemplary only; accordingly, it should be understood that the practice of applying the autodepositing composition in accordance with this invention is not limited to latexes containing the aforementioned surfactants. For example, there can be used any anionic surfactant which will lower the interfacial tension between the monomeric reactants and water sufficiently to result in the formation of stable colloidal dispersions of the monomers in the water and, in addition, is stable in autodepositing compositions formulated therefrom. It is noted further that the activating system (for example, acid and oxidizer) of the autodepositing composition functions to dissolve positively charged cations from the metallic substrate which cause the negatively charged latex polymer particles to autodeposit on the metallic surface. The anionic surfactant should be a material which functions accordingly. Mixtures of two or more suitable anionic surfactants may be used.

For reasons mentioned above, and as explained in aforementioned U.S. Pat. No. 4,191,676, the surfactant concentration of externally stabilized latexes should be relatively low so that the aqueous phase of the autodepositing composition has a surfactant concentration below the critical micelle concentration and preferably below the surfactant concentration which corresponds to the inflection joint on a graph of surface tension versus the logarithm of surfactant concentration in the composition, as referred to in the aforementioned '676 patent. Accordingly, it is preferred that the latex containing the externally stabilized resin be prepared by emulsion polymerization with a very low concentration of surfactant. This is best achieved by seed polymerization or semicontinuous polymerization as opposed to batch emulsion polymerization. In the seed polymerization process or semicontinuous polymerization, the amount of surfactant can be limited by adding surfactant and monomer in such a manner that the monomer continues to polymerize with particles already present rather than forming new particles. This gives greater uniformity of particle size distribution and also gives good control of the total amount of surfactant in the latex. The stability of the colloidal latex can be partially attributed to charged polymer end groups whose provenance is the polymerization initiator.

In general, such latexes will have a relatively high surface tension, that is, at least about 40 dynes/cm. Such latexes can be used in the practice of the present invention, and preferably, there are used such latexes that have a surface tension of about 55 to 70 dynes/cm. In particular, such latexes in which there is no protective colloid are preferred class for use in the present invention.

Polymers having a vinylidene chloride content of between about 50 to 90% by weight or higher, based upon the total weight of polymer, can be used. When vinyl chloride is employed as one of the comonomers, the vinylidene chloride content can be less than about 70% by weight. The total chloride content, however, is preferably at least 50% by weight or more based on total polymer weight. Generally speaking, the internally stabilized latexes which are the preferred class of latexes according to this invention can be used at even lower chloride contents, thereby enabling the inclusion of other copolymers to enhance the desirable polymer characteristics such as hardness, gloss, solvent resistance and the like, in addition to corrosion resistance attributable to reduced vapor permeability.

Latexes for use in the practice of the present invention are available commercially. Examples of such latexes are the Saran latexes such as, for example, Saran 143 and Saran 112 available from Dow Chemical co., the Serfene latexes available from Morton chemical, and the Haloflex latexes such as, for example Haloflex 202 available from Imperial Chemicals Industries.

If desired, the autodepositing composition can be prepared from two or more latexes containing different resins. Such a composition will comprise a blend of the vinylidene chloride-containing polymers described above, typically in an amount of about 50 to 95% by weight of the total resin solids, and one or more other latexes including, for example, styrene-butadiene resins, poly(vinyl chlorides), acrylic resins and the like.

The amount of the resin comprising the autodepositing composition for practicing the present invention can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed. Although coating compositions can be formulated with a range of about 5 to 550 g/l of resin solids, the amount of the resin solids will tend to vary depending on the other ingredients comprising the composition and also on the specific latex or resin used. For many applications, good results can be achieved utilizing about 50 to 100 g/l of resin solids in the composition.

Optional ingredients can be added to the composition as desired. For example, it is believed that the present invention will be used most widely in curing pigmented autodeposited coatings. For this purpose, suitable pigments can be included in the composition. Examples of pigments that can be used are carbon black, phthalocyanine blue, phthalocyanine green, quinacridone red, benzidene yellow and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using an aqueous dispersion in an amount such that the composition contains about 0.2 to 3 g of furnace black/100 g of resin solids.

Many pigments are available in aqueous dispersions which may include surfactants or dispersing agents for maintaining the pigment particles in dispersed state. When utilizing such pigment dispersions in the composition, they should be selected so that the surfactant concentration in the aqueous phase of the composition is below the CMC, preferably below the surfactant concentration which corresponds to the inflection point on a graph of surface tension versus the logarithm of surfactant concentration in the composition. The surfactant should preferably be selected from those indicated above with respect to the preparation of the externally stabilized latexes. Suitable pigmented compositions are illustrated in examples herein.

Colored coatings can also be cured in accordance with the present invention. They can be formed from compositions which include a dye, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredients or additives, the total amount of surfactant in the aqueous phase of the composition should be maintained below the CMC. Preferably, the aqueous phase of the composition contains little or no surfactant.

In case a surfactant is utilized, the preferred surfactants are the anionic surfactants. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition, the constituents thereof can be admixed in any suitable way, for example, as described in aforementioned U.S. Pat. No. 4,191,676.

The autodepositing composition may be cured by contact with an aqueous curing medium which may include a solute such as amphoteric and cationic surfactants as disclosed in U.S. Pat. No. 4,647,480, incorporated herein by reference. The presence of a solute in the aqueous curing medium eliminates the film of water between the coating and the substrate by drawing the water through the coating by osmosis where the water then evaporates.

A particularly preferred autodepositing composition has a high degree of solvent and corrosion resistance and includes an acrylic-based, nitrile-containing resin having a Tg of at least 58° C. and which is prepared from a soluble ferric ion-containing compound and hydrofluoric acid, and which includes also, in emulsified form, a fugitive plasticizer containing 2,2,4-trimethylpentanediol-1,3-monoisobutyrate, the emulsifying agent associated with said plasticizer being an anionic emulsifying agent as disclosed in U.S. Pat. No. 4,874,673, incorporated herein by reference.

The following examples are for illustrative purposes only and are not intended to limit the invention as encompassed by the claims forming part of the application.

EXAMPLE 1

A panel of cold rolled steel measuring 3"×4" was immersed in an industrial cleaner containing an inorganic builder and surfactant (Ridoline 72 manufactured by the Parker & Amchem Division of Henkel Corp. of Madison Heights, Mich.) for 2 minutes at 160° F. The panel was then rinsed under a steady stream of tap water for 30 seconds followed by deionized water for 10 seconds.

The pre-cleaned panel was then positioned as shown in FIG. 1, approximately 2" from the conduit 16. An autodepositing composition as shown in Table 1 was pumped at a flow rate of 0.5 gpm from the vessel 4.

TABLE 1

| INGREDIENT | AMOUNT (IN GRAMS, 100% ACTIVE INGREDIENTS BASIS) |
|---|---|
| Vinylidene chloride-acrylonitrile-butyl acrylate copolymer latex | 50.00 |
| Methyl paraben | 0.06 |
| Colloidal carbon black pigment | 1.88 |
| Ferric fluoride | 3.00 |
| Hydrofluoric acid | 1.40 |
| Deionized water | Balance to make one liter of bath |

The temperature of the autodepositing composition was 70° F. and the coating operation was conducted for two minutes to produce an autodeposited coating having a thickness of 0.5 mil. The panel was then rinsed with tap water for 30 seconds thereafter baked at 100° F. for 20 minutes.

The resulting baked panel was visually observed and compared to a panel coated by immersion in a bath of the same autodepositing composition. The baked panel appeared visually to be equivalent to the immersed panel.

The baked panel was subjected to a series of standard tests and determined to have a pencil hardness of 5H and an impact strength of 160 inch-lb. Corrosion resistance was measured according to ASTM:B117 with the following results: Scribe=7.5; and Field=9.5. These results are comparable to the corrosion resistance values obtained with panels coated under the standard immersion process.

EXAMPLE 2

A process of coating a cold rolled steel panel of the type described in Example 1 was conducted using the autodepositing composition shown in Table 2.

TABLE 2

| INGREDIENT | AMOUNT (IN GRAMS, 100% ACTIVE INGREDIENTS BASIS) |
|---|---|
| Acrylic resin latex | 58.00 |
| Dodecyl diphenyloxide disulfonate (surfactant) | 0.14 |
| TEXANOL ™ (ester alcohol) | 12.20 |
| Colloidal carbon black pigment | 1.88 |
| Ferric fluoride | 3.00 |
| Hydrofluoric acid | 1.40 |
| Deionized water | Balance to make one liter of bath |

The autodepositing composition was continuously supplied to the panel using the system shown in FIG. 1. The length of coating was varied to obtain a coating having a thickness of about 0.5 mil. The panels were pre-treated with Rodiline for two minutes at 160° F., and then with tap water for 30 seconds followed by deionized water for 10 seconds. The autodepositing composition was then flow coated onto the precleaned panels for about two minutes.

The coated panels were rinsed with tap water for 30 seconds and then with a 4% chrome solution for about one minute. The resulting panels were baked at 160° C. for 20 minutes.

The baked panels had an acceptable appearance. Physical tests of the type described in Example 1 showed a pencil hardness of 2H, impact strength of 40 inch-lb. and good resistance to solvents as well as essentially the same resistance to corrosion as described in Example 1.

EXAMPLE 3

A panel of cold rolled steel measuring 3"×4" is pre-cleaned as described in Example 1. The pre-cleaned panel is then coated with the autodepositing composition shown in Table 1 using the apparatus shown in FIG. 5.

The autodepositing composition is sprayed through a nozzle of the same type used in typical aerosol cans for spraying paint and the like. The resulting panels are tested in the same manner described in Example 1 and found to exhibit similar properties.

EXAMPLE 4

Tin plated steel cans produced by the American Can Company were coated with an autodepositing composition in accordance with the following:

TABLE 3

| COMPOSITION | TYPE OF COATING | DURATION OF COATING |
|---|---|---|
| 1 | TABLE 1 | FLOW COAT | 1 SECOND |
| 2 | TABLE 1 | FLOW COAT | 1 SECOND |
| 3 | TABLE 1 | IMMERSION | 15 SECONDS |
| 4 | TABLE 1 | FLOW COAT | 1 SECOND |
| 5 | TABLE 1 | FLOW COAT | 15 SECONDS |
| 6 | TABLE 2 | FLOW COAT | 15 SECONDS |
| 7 | TABLE 2 | FLOW COAT | 15 SECONDS |
| 8 | TABLE 2 | FLOW COAT | 15 SECONDS |
| 9 | TABLE 2 | IMMERSION | 15 SECONDS |
| 10 | TABLE 2 | IMMERSION | 15 SECONDS |

Each of the cans was tested in the same manner as Example 1 and found to have acceptable coatings.

What is claimed is:

1. A process for forming an autodeposition coating on a substrate having a metallic surface comprising applying an aqueous resinous autodepositing composition to the substrate intermittently from a motile source of the autodepositing composition.

2. The process of claim 1 comprising spraying the autodepositing composition onto the metallic substrate.

3. The process of claim 1 comprising passing a stream of the autodepositing composition onto the metallic substrate.

4. The process of claim 1 wherein the autodepositing composition an aqueous latex dispersion, an acid and an oxidizing agent.

5. The process of claim 1 comprising applying the autodepositing composition to the substrate through at least one conduit having at least one opening.

6. The process of claim 5 wherein the autodepositing composition is applied to the substrate from at least two spaced-apart conduits.

7. The process of claim 5 wherein the autodepositing composition is applied to the substrate through at least two spaced apart openings in each conduit.

8. The process of claim 1 wherein the autodepositing composition is applied at a flow rate of about 0.001 ml/cm$^2$ to 100 ml/cm$^2$.

9. The process of claim 8 wherein the flow rate is 5 ml/cm$^2$ to 10 ml/cm$^2$.

10. The process of claim 1 wherein the autodepositing composition is applied for a time sufficient for the composition to adhere to the substrate but for less time than it takes for the composition to dry on the substrate.

11. The process of claim 2 comprising passing the autodepositing composition through a nozzle adapted to emit a spray of the composition at a distance of from about 6 to 12 inches from the substrate.

* * * * *